Sept. 18, 1951  H. P. WOOD  2,567,983
METHOD OF DRYING LUMBER
Filed Dec. 19, 1946  6 Sheets-Sheet 1

INVENTOR.
Harold P. Wood
BY Geo. Woodworth
ATTORNEY

Sept. 18, 1951        H. P. WOOD        2,567,983
METHOD OF DRYING LUMBER

Filed Dec. 19, 1946        6 Sheets-Sheet 2

INVENTOR.
Harold P. Wood
BY
Geo. K. Woodworth
ATTORNEY

Sept. 18, 1951 H. P. WOOD 2,567,983
METHOD OF DRYING LUMBER
Filed Dec. 19, 1946 6 Sheets-Sheet 3
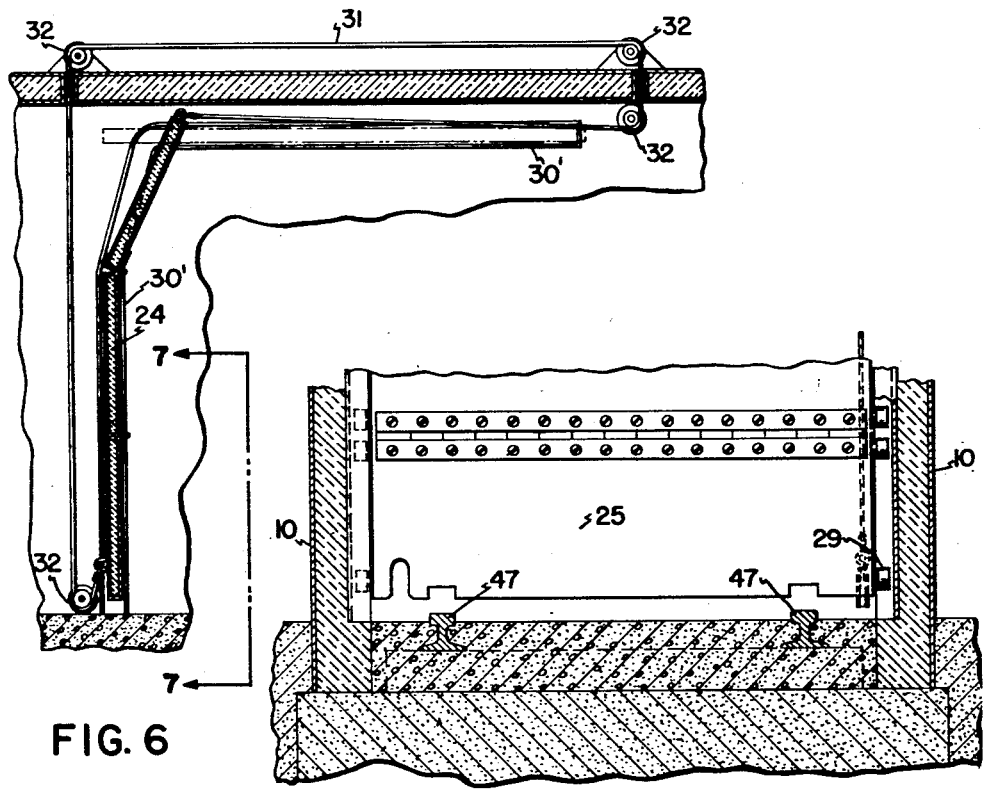
FIG. 6
FIG. 7
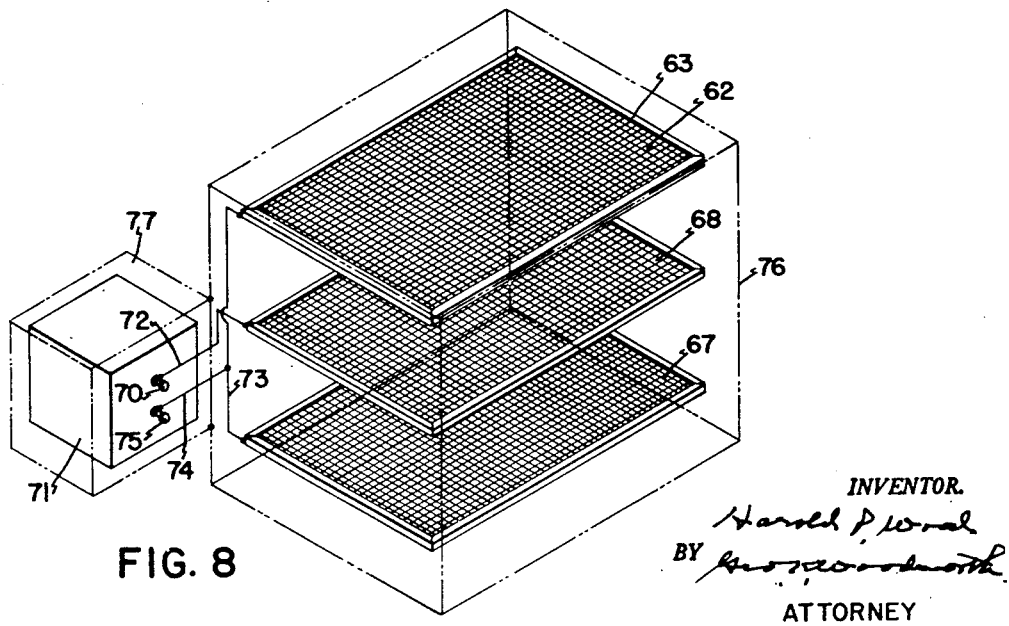
FIG. 8
INVENTOR.
Harold P. Wood
BY
ATTORNEY Sept. 18, 1951 H. P. WOOD 2,567,983
METHOD OF DRYING LUMBER
Filed Dec. 19, 1946 6 Sheets-Sheet 4
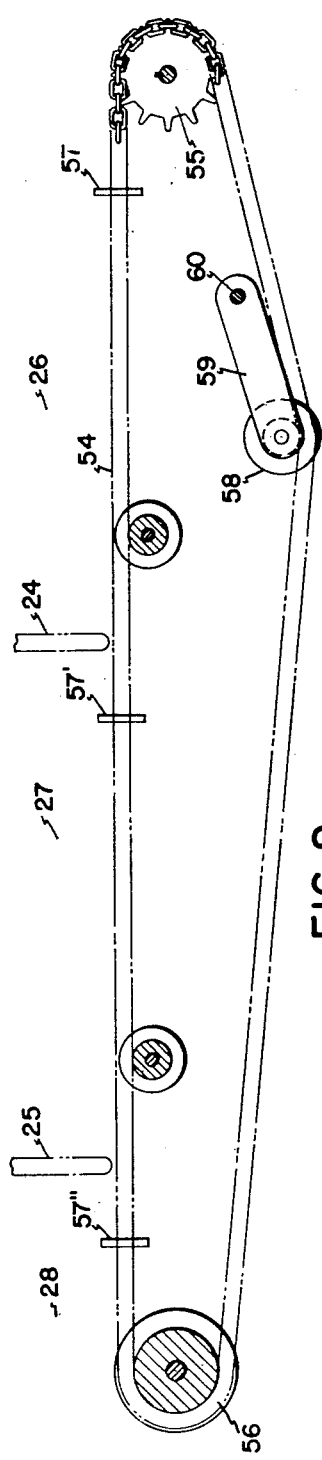
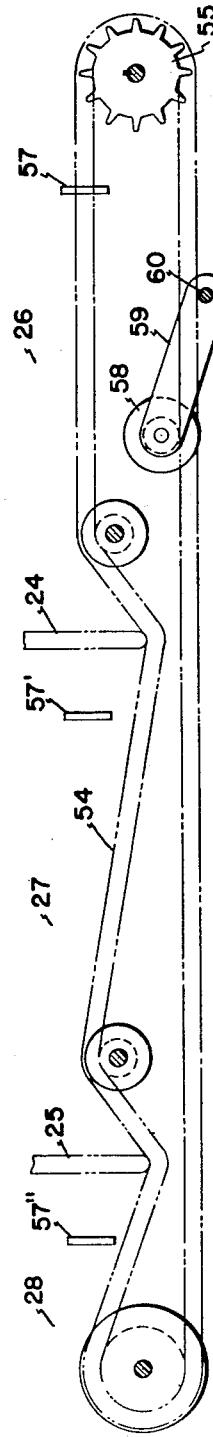
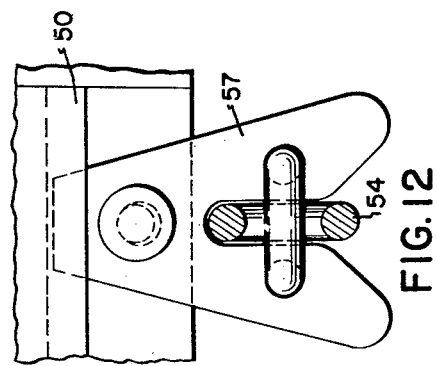
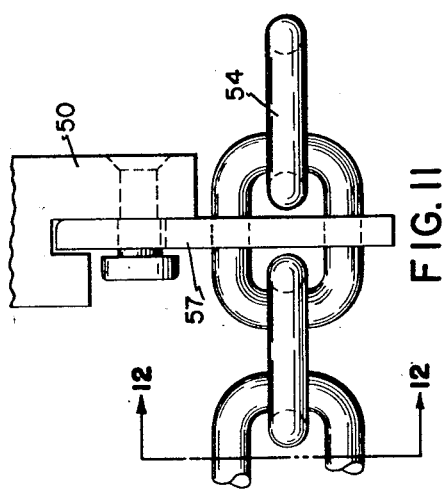
INVENTOR.
Harold P. Wood
BY
ATTORNEY Sept. 18, 1951  H. P. WOOD  2,567,983
METHOD OF DRYING LUMBER
Filed Dec. 19, 1946  6 Sheets-Sheet 6

INVENTOR.
Harold P. Wood
BY
ATTORNEY

Patented Sept. 18, 1951

2,567,983

UNITED STATES PATENT OFFICE 2,567,983

METHOD OF DRYING LUMBER

Harold P. Wood, North Berwick, Maine, assignor to Wood Electro Process Company, South Berwick, Maine, a corporation of Maine Application December 19, 1946, Serial No. 717,207

5 Claims. (Cl. 34—1)

This invention relates to a method of and an apparatus for drying large masses of green moisture laden wood and, more particularly, wood in the form of lumber.

It has long been known that a large mass of green lumber could be dried by subjecting it to heated air and that a small quantity of wood could be dried by subjecting it to high frequency electric power.

However, a relatively long time, approximately one week, is required to dry green lumber by heated air and frequently such lumber so dried is discolored not only by the distillation of the pitch content thereof, but also by the creation of a grayish-blue mold or fungus growth on its surfaces which must be planed off before the lumber is suitable for use.

The cost of drying a large mass of green lumber by high frequency power is prohibitively high and is not commercially practicable, because, among other reasons, green lumber has a high moisture content and therefore a high dielectric constant, the dielectric constant of water being 80. Hence, the condenser of which the lumber is the dielectric will be of relatively large capacitance and its circuit will have a high power factor. This will result in an enormous dissipation of power for many hours until the moisture content of the lumber has been materially reduced. Even if the wood is not dried by the application of high frequency power alone, but by the use of high frequency power and heated gas simultaneously, the result will not be substantially different from that above set out. The cost of drying a large mass of green lumber by high frequency power alone or by high frequency power and heated gas simultaneously would greatly exceed that of drying it by the methods now employed which involve the use of heated air alone. Furthermore, the resulting rapid evaporation of moisture will build up internal pressures which rupture, check and distort the lumber. Moreover, the internal heat developed in the lumber will cause discoloration of the surfaces of the boards by blackening the pitch pockets.

I have discovered, however, that a large stationary mass of completely enclosed green lumber may be partially dried by subjecting it to a current of heated gas, preferably air, for a relatively short time compared to that required to produce commercial dried lumber by the dry-kiln method now in use, for example, eight hours, without blackening the pitch pockets, or creating mold or fungus on the surfaces thereof, and that the moisture content of the lumber may then be reduced to a percentage within the range of the moisture content of commercial dried lumber by subjecting it to high freequency electric power and preferably a current of heated gas simultaneously with the electric power treatment for a relatively shorter length of time, for example, four hours, without distortion or discoloration of the lumber. My tests were made with white pine. For harder woods, the time factors would be somewhat different but always the period of the application of the electric power will be much shorter than that of the application of the heated gas.

One of the many advantages and useful results secured by my method is that lumber treated in this manner will not thereafter develop mold or fungus on its surface, for the reason that the temperature to which the lumber is raised by the high frequency power, is sufficient to kill, and therefore prevent further growth of, the spores latent in the wood from which the mold or fungus is created.

It is therefore the principal object of my invention to provide a method of and an apparatus for drying a large mass of green lumber, first, by subjecting it to a current of heated gas for a sufficient length of time to reduce the moisture content thereof without distortion or discoloration and then subjecting it to high frequency electric power for a sufficient length of time, shorter than that of the heated gas treatment, to reduce the moisture content of the lumber to a percentage within the range of the moisture content of commercial dried lumber without distortion or discoloration, whereby the time required for drying green lumber, and the expense thereof, are greatly reduced.

While, preferably, the first step of my method may be performed by the apparatus herein described, or any suitable equivalent thereof, it is feasible partially to dry a large mass of green lumber in any of the ways now employed for this purpose, for example, by subjecting it to heated air in a kiln at the usual progressively increasing temperatures for the usual time, say, about one week, or subjecting it to the atmosphere and sun for about one year. Lumber so treated usually is discolored as aforesaid.

It is therefore another object of my invention to provide a method of and an apparatus for drying a large mass of partially dried lumber, such as kiln dried or air dried lumber, by subjecting such mass to high frequency electric power for a length of time sufficient to reduce the moisture content thereof to a percentage within the moisture content of commercial dried lumber and simultaneously subjecting the same to a current of heated gas, such as air, having a temperature low enough to prevent the temperature of the lumber due to the combined action of the electric power and heated gas from rising high enough to cause discoloration, or further discoloration, as the case may be. The time for producing commercial dried lumber in this manner is much longer than that required by my preferred method above stated, and the lumber, if affected by the mold aforesaid, must, either prior to the application of the electric power, or at the end of such process, be planed to a depth of about 1/50 of an inch.

An apparatus whereby my improved method may be practiced in such manner as greatly to reduce the cost of producing commercially acceptable dried lumber and the time required to produce it is claimed in my divisional application Serial No. 18,277, filed March 31, 1948, now Patent No. 2,543,618, issued February 27, 1951.

Other objects will appear from the appended claims and the detailed description of the drawings which illustrate one of the many forms of apparatus and circuit arrangements whereby my method may be realized in practice, it being understood, of course, that said method is broader than mere apparatus and may be realized by a variety of means.

In the drawings accompanying and forming a part of this specification,

Fig. 6 is a sectional view on an enlarged scale taken on substantially the same plane as Fig. 2.

Fig. 7 is a fragmentary section partly in elevation, taken on the line 7—7 of Fig. 6.

Fig. 8 is an isometric view, representing schematically the relative positions of the electrodes and their connection to the source of high frequency power.

Figs. 9 and 10 are diagrammatic sectional-elevational views explanatory of the means employed for moving a truck load of wood progressively through the several chambers.

Fig. 11 is a side elevation of a detail of construction.

Fig. 12 is a vertical section taken on the line 12—12 of Fig. 11.

Figs. 13-18, inclusive, are diagrammatic sectional views representing the relative positions of the truck loads of wood and the several compartments of the continuous chamber at various stages of the process.

Figure 19:
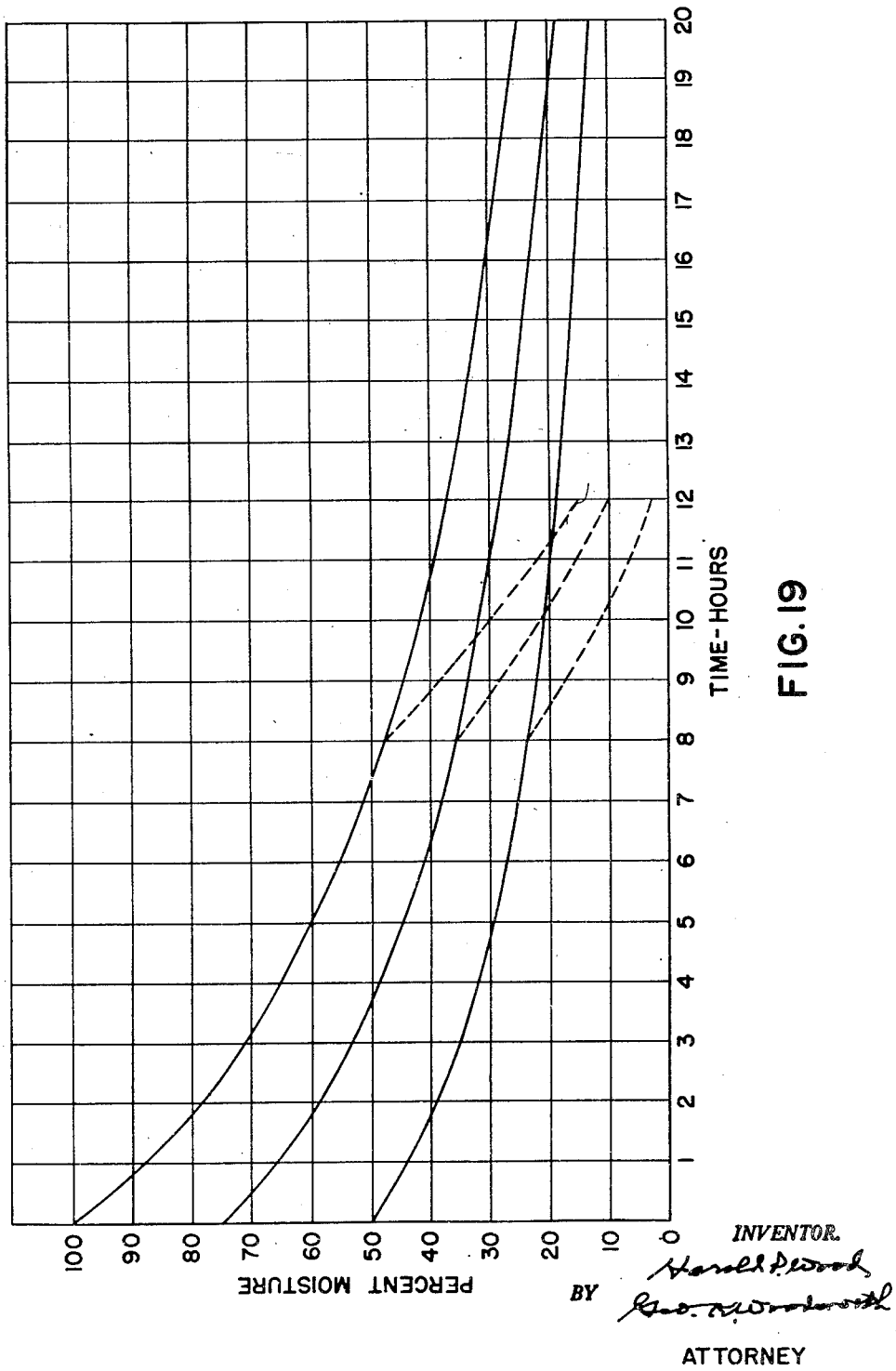

Fig. 19 shows a family of curves drawn to rectilinear coordinates illustrating the variation of the moisture in the wood with the periods of application of the heated gas and the high frequency electric power.

In the particular drawings selected for more fully disclosing my invention, and the underlying principles thereof, said drawings being illustrative, merely, and not restrictive, 20 is a heat insulated continuous longitudinally extending chamber having movable end closures 21, 22, shown, in the present instance, as vertically movable doors guided by the channels 23, and movable partitions 24, 25, intermediate the ends of the chamber for dividing the same into communicating compartments, herein shown as three, said compartments being identified by the reference numerals 26, 27, 28, respectively. The movable partitions may be doors, each having a number of hingedly connected sections commonly known as "garage doors," each section being provided with rollers 29 enclosed within the usual guides 30' (Figs. 6 and 7). Means preferably are employed for operating said doors from the exterior of the chamber and, in the present instance, the operating means are shown as a cable 31 trained around the sheaves 32 and having its ends connected to the respective ends of the door whereby an operative on the roof of the chamber may move the partitions to operative or vertical position, as indicated at the left end of compartment 27 in Fig. 2 or horizontal or inoperative position as shown at the right end of said compartment.

Each compartment is provided with louvres 33 that may be controlled in any suitable manner, as, for example, the rods 34 each provided with a hand piece 35 at its upper end. It is to be understood, of course, that any suitable means may be employed for varying the temperature of the heated gas supplied to each compartment, as well as the amount thereof.

For supplying heated gas, preferably air, to each compartment, there is provided a suitable source of such gas or air indicated at 36, each said source being connected to one of said compartments by a supply conduit 37, preferably controlled by a valve 38, and an exhaust conduit 39, suitable means, such as the blower 30 being provided to draw the heated gas from its source and return it thereto. The velocity of the heated gas through each compartment will of course be controlled by the speed of the blower, and said louvres.

The humidity of the heated gas in each compartment may be controlled by any suitable type of humidostat and a ventilator or other means controlled thereby. In the present instance, a humidostat 40 is placed in the interior of each compartment and may be supported by the frame 41 depending from the roof thereof. A small source of electromotive force, such as a one cell battery 41, is controlled by the humidostat to energize or deenergize the relay 42, the armature of which controls the circuit of the solenoid 43, which includes the battery or other suitable source of electromotive force 44 that is larger than that of the source 41. By suitable connections, the core 45 of the solenoid will actuate a suitable ventilator, such as that shown at 46.

A pair of rails 47 are laid on the bottom of the continuous chamber and extend a suitable distance beyond the ends thereof. A truck or truck-like carrier for moving the lumber to be treated into or out of said chamber and through the several compartments thereof is mounted on the wheels 48, which preferably are provided with double flanges. In the present instance, a plank 49 is placed longitudinally across the bifurcated member 50 in the depending sides of which said wheels are journalled, and a series of planks 51 are placed transversely across the pair of planks 49. It is to be understood, of course, that any suitable form of wheeled carrier, such as a truck, may be employed in place of the "dolly" above described.

Upon the truck-like carrier, the lumber to be treated is placed, the boards 52 being spaced by sticks 53.

Any suitable means may be employed for moving the truck-like carriers with their respective loads of lumber through the continuous chamber, and, preferably, such means must be of such nature as to co-operate with the movable partitions 24, 25, in such manner that it is only when the latter are in inoperative position that a load of lumber can be moved into or out of the middle compartment 27. In the present instance, I have shown a continuous band means in the form of endless chain 54 trained around a sprocket 55 at the forward end of the chamber and around a sheave 56 at the rearward end thereof, said chain being held taut by a weighted sheave 58 rotatably mounted in the arm 59 which is pivoted at 60 to a suitable support (Figs. 9, 10). Secured to and projecting from the outer face of each member 50 is a saddle 57 (Figs. 11 and 12) so disposed as to co-operate with said chain when either of the partitions 24, 25, is in elevated or inoperative position, but when said partitions are in vertical or operative position, portions of the chain or band means will be depressed and thereby uncoupled from the saddle. For example, if the parts were in the position shown in Fig. 9, in which the doors 24, 25, are open, the turning of the sprocket clockwise in any suitable manner as by the crank 61 would result in the moving through the chamber of each of the three truck-like carriers, but in the position shown in Fig. 10, in which the doors 24, 25, are closed, the clockwise turning of the sprocket would result only in the movement of the truck at that time located in compartment 26, and, in such case, said truck would move out of the compartment, the end door 21 being open and the tracks extending beyond the end of the chamber sufficiently to permit the truck to pass completely out of said compartment.

If, however, in Fig. 10 the door 24 were open and the saddle 57' were in co-operative engagement with the chain, the clockwise rotation of the sprocket would move the truck in compartment 26 out of said chamber and would move the truck in compartment 27 into chamber 26. As hereinafter more fully explained, the door 24 is never opened until after the truck and its completely treated load of lumber in compartment 26 have been moved out of said compartment and the door 21 has been closed. In such case, the door 24 being raised, the heat in chamber 27 is not lost but is distributed between compartments 26 and 27 so that when the truck and its load of lumber are moved out of compartment 27 to compartment 26 and the door 24 is again closed preparatory to the treatment of the lumber in compartment 26 with high frequency power and heated gas, the load in compartment 26 would not be subjected to the effects of the outside unheated air. In like manner, the door 25 is never raised until a load of lumber has been drawn into compartment 28 and the end door 22 closed. When in the course of the process it is desired to move a load from compartment 28 to compartment 27, the door 25 is raised and the chain brought into co-operation with the saddle 57'', whereupon said load will be drawn into compartment 27 without any dissipation of heat, the doors 24 and 22 both being closed.

Near the top of chamber 26 is disposed a vertically movable electrode 62, such electrode preferably being formed by heavy wire mesh and supported by channels or other suitable members 63. By means of the rods 64, each provided with a hand piece 65, and secured to said channels by the cross rods 66, the electrode 62 may be elevated or depressed in accordance with the height of the load of lumber with which it is to co-operate. A similar electrode 67 is placed on the truck-like carrier and, in the present case, where such carrier is a dolly, said electrode will rest on the transverse planks 51. Thus, the electrode 67 is disposed between the carrier and the wood. Generally speaking, a third electrode 68 will be employed and disposed in contact with the wood approximately midway between the other two. This electrode also will be disposed between the carrier and the upper section of the lumber.

Figure 1:
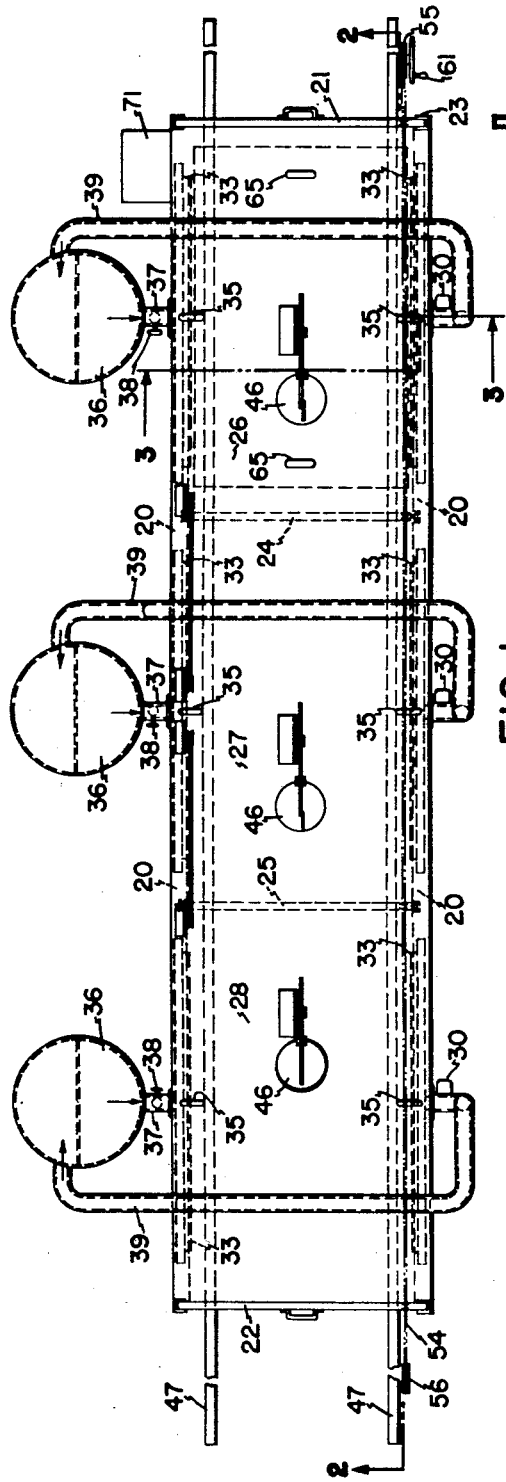
Figure 1 is a plan view.
Figure 2:
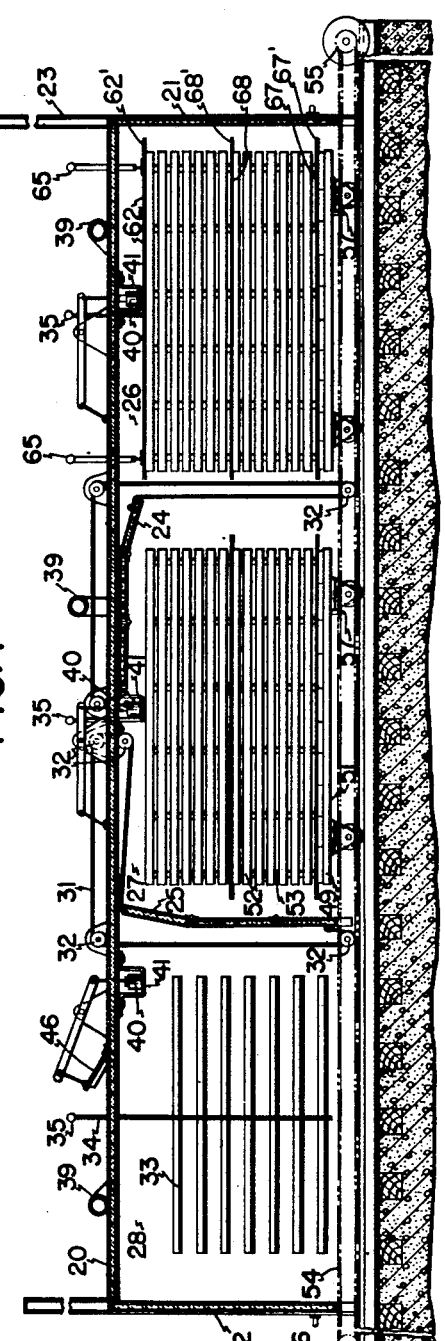
Fig. 2 is a longitudinal vertical section taken on the line 2—2 of Fig. 1.

In order to secure a uniform electric field, the outer edges of all electrodes should extend substantial distances beyond the edges of the lumber to be treated (62', 67', 68', Figs. 2 and 8).

Figure 3:
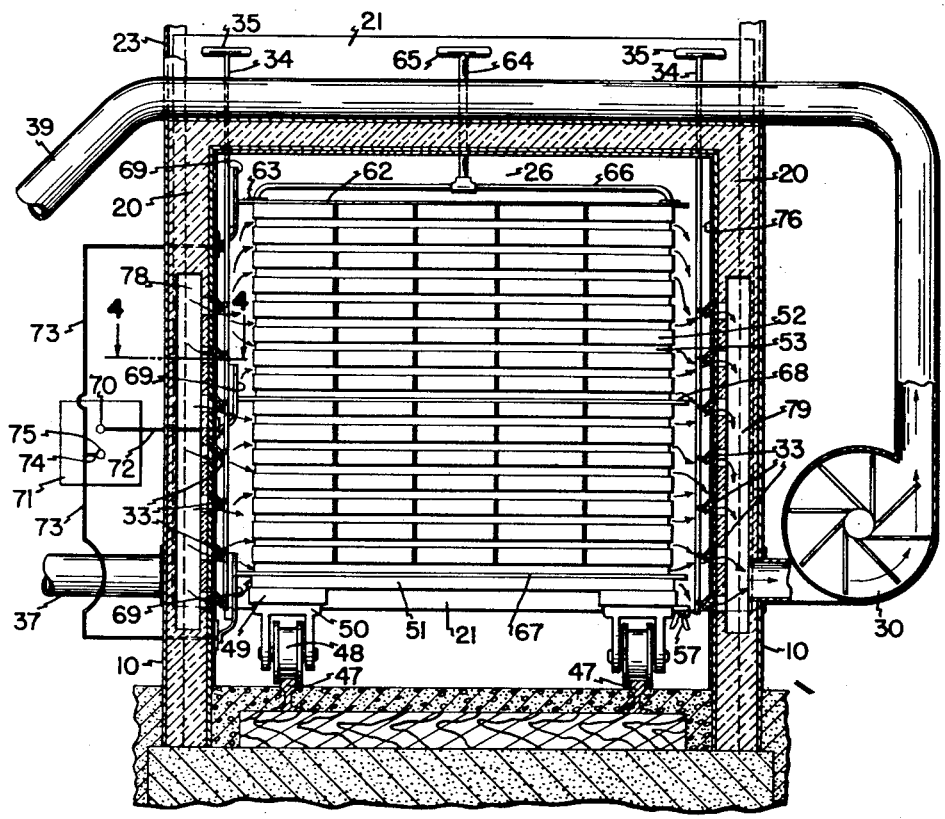
Fig. 3 is a transverse vertical section taken on the line 3—3 of Fig. 1.
Figures 4, 5:
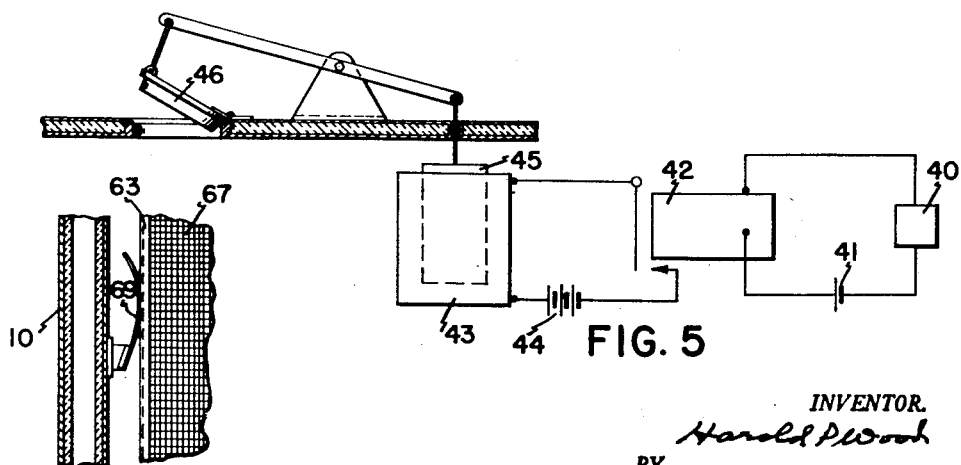
Fig. 4 is a horizontal section taken on the line 4—4 of Fig. 3.
Fig. 5 is a sectional view on an enlarged scale, partly elevational and partly schematic, showing one way in which the humidity of the heated gas in each of the compartments may be controlled.
Figure 13:
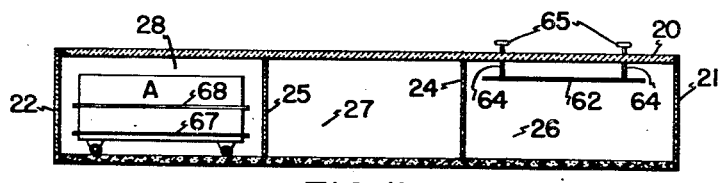

In order to connect the electrodes to the source of high frequency power, brushes, preferably of resilient material, may be attached to the wall of the chamber 26 in such position as to co-operate with the edges of the electrodes. In the present instance, I have shown three such brushes 69, each being formed of resilient material and consisting of a curvilinear sheet of substantial height, as shown in Figs. 3 and 4, in order to accommodate themselves to the varying distances above the base of the chamber of the three electrodes. If three electrodes are employed, one of them, for example, the center electrode, is connected to one terminal 70 of the source of high frequency electric power 71 by the lead 72, and the other two are connected together by the lead 73 and the latter connected by the lead 74 to the other terminal 75 of said source.

In order to prevent the radiation of high frequency electric waves, the chamber 26 and the source of high frequency power 71, are both shielded by suitable shields 76, 77, which shields may be copper mesh or metal coated paper or the like.

While, as hereinbefore stated, my method may be practiced by a variety of means, I have described in some detail an apparatus by means of which my process may be carried out on a commercially profitable scale. It is to be understood, however, that all constants and magnitudes, such as the number of compartments into which the chamber is divided, the temperature of the heated gas to which the lumber is subjected, the frequency of the high frequency power, the wattage thereof applied to the lumber, and the amount of lumber treated, are given merely by way of examples, and are not to be considered as limitations of the process or apparatus.

By means of the apparatus described, 4000 board feet of green moisture laden lumber may be dried in 12 hours and converted into "commercial dried lumber" having a moisture content between 4% and 15%, the moisture content of green or freshly cut pine as it comes off the saw mill being taken as 100% (see Fig. 19). At the end of every four-hour period following the first 12-hour period, 4000 more board feet will be commercially dried, making in all, 16,000 board feet for the first day's operation of 24 hours. On the second and following days, 4000 board feet of green lumber may be converted to commercial dried lumber every four hours, making an output of 24,000 board feet per day of 24 hours.

I have illustrated a continuous chamber divided into three compartments, each capable of treating 250 boards, each 1 foot wide, one inch thick and 16 feet long, each such board containing 16 board feet. In each chamber, therefore, there will be 250 of such boards and, in such case, the third or intermediate electrode 68 will be desirable if the voltage of the high frequency generator does not exceed about 10,000. There will then be about 125 boards or about 2000 board feet on each truck between the electrodes 67 and 68, and a like amount between the electrodes 62 and 68.

The temperature of the heated gas ought not to exceed approximately 225° F. and the velocity of the current of heated gas in the first chamber 28 may be about 200 feet per minute. The high frequency electric power of about 6.5 mc. per second applied to the wood in the third chamber may be about 20 watts per pound of the partially dried wood, and ought not to exceed 35 watts per pound of such wood. Any suitable type of high frequency oscillator having a rating of about 200 kw. may be used in the instant case. The cost of treating lumber with heated air having a temperature of about 225° F. per unit of time is approximately only 10% that of treating lumber with high frequency power at the rate of twenty watts per pound of wood.

The humidity in the first compartment 28 ought to have a range of from 50% to 80%; in the second compartment 27, between 20% and 50%; and in the third compartment 26, between 5% and 20%. The velocity of the current of heated air in the second and third compartment should be high enough to maintain the desired humidity. Thus, as the wood in compartment 27 is drier than the wood in the first compartment, the velocity of the current of heated air in compartment 27 may be higher than that of the current of heated air in compartment 28 and the velocity of said current in compartment 26, higher than that of the current in compartment 27.

As the discoloration of the wood due to heat treatment is a function of time as well as temperature, it follows that if the treatment of the lumber in each compartment exceeds four hours, the temperature of the heated air may be lower than 225° without causing discoloration and also that if the time of treatment is less than four hours, the temperature of the heated air may exceed 225°.

Figure 14:
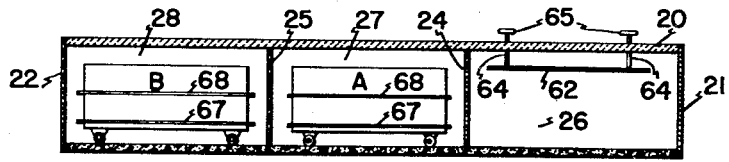
Figure 15:
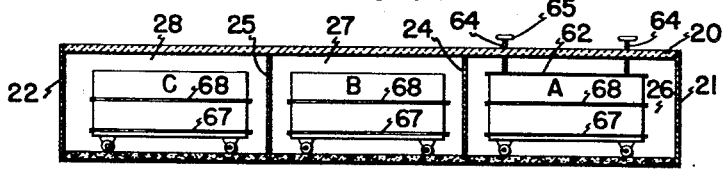
Figure 16:
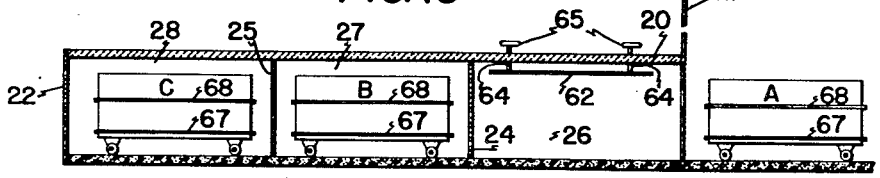
Figure 17:
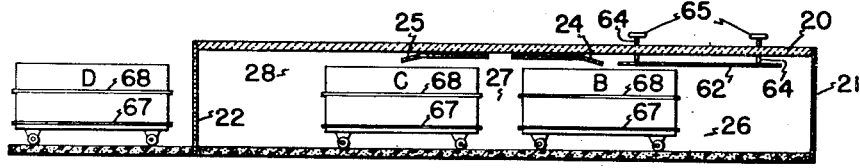
Figure 18:
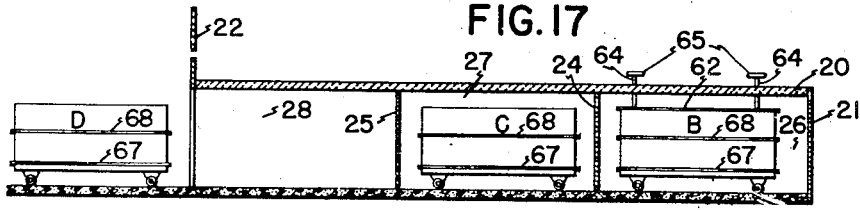

Referring to Figs. 13 to 18, Fig. 13 represents the first stage in my continuous process. A load of 4000 board feet of green lumber is placed on truck A and run into chamber 28, and a current of heated gas is then circulated and recirculated through said chamber and through the spaces between each pair of boards separated, as aforesaid, by the sticks 53, for approximately four hours. The door 25 is then opened in the manner above described, thereby coupling the chain 54 with the saddle 57'' on one of the forward wheels of truck A, the sprocket 55 rotated in a clockwise direction and the truck A moved to chamber 27, as shown in Fig. 14. The door 25 is then closed and the outer door 22 opened and truck B, also carrying a load of 4000 board feet, is moved into compartment 28 and door 22 closed. Heated air is then recirculated through compartment 27, 28, for four hours. At the end of this second four-hour treatment, when the wood on truck A has had eight hours of heated air treatment and the wood on truck B, four hours of such treatment, the doors 24 and 25 are both opened, thereby coupling the chain with the saddles on trucks A and B, the sprocket turned as aforesaid, and both trucks moved forward until truck A is in compartment 26, and truck B in compartment 27 as indicated in Fig. 15. The intermediate doors are now closed, thereby conserving the heat, then door 22 is opened and truck C carrying a load of 4000 board feet is pushed into compartment 28, the door 22 closed, and the heated air recirculated through each of the three chambers for four hours and simultaneously therewith, the three electrodes are connected to the high frequency generator thereby subjecting the lumber on truck A to high frequency power for four hours. The door 21 is now opened and truck A is drawn out of its compartment, as indicated in Fig. 16. The door 21 will then be closed, both of the intermediate doors opened, truck B drawn into compartment 26, and truck C into compartment 27, as indicated in Fig. 17. After trucks B and C have reached their respective compartments, the intermediate doors are closed and the end door 22 raised, whereupon truck D will be run into compartment 28, the door 22 closed, the heated air currents recirculated through the wood in each of the compartments for four hours, and in compartment 26, the lumber on truck B having received eight hours of heated air treatment before it was moved into compartment 26 will be subjected for four hours to the high frequency electric power and heated air. The process may thus be continued from day to day, 24 hours a day with the production of 24,000 board feet of commercial dried wood every 24 hours after the first 24 hour period.

It is of course not essential that three compartments should be used, for obviously my process could be carried out on a smaller scale by the use of a single compartment, such as the third compartment 26, in which case, the wood would be placed in said compartment by any suitable means, the boards being separated to afford easy access of heated air and then treated for 8 hours with such heated air and at the end of that period, with high frequency electric power and heated air for four hours. In that way, if 4000 board feet were treated, the output would be only 8000 board feet in 24 hours.

While it has just been pointed out that all of the drying could be conducted in a single compartment in which air drying was applied for two units of time, namely, eight hours, and high frequency energy drying was applied for one unit of time, namely, four hours, it will be understood that additional time units of air drying might be necessary with certain types of woods. For example, it may be found necessary to air dry a particular type of wood for twelve hours to bring it to a moisture content of less than 50%. In such case, the wood would be air dried three time units of four hours each, preceding the final high frequency drying stage consisting of four hours or one time unit. Thus, if each time unit of drying were conducted in individual compartments, three air drying compartments would be necessary to provide for the three successive four hour time units of air drying in the case just suggested, to be followed by the compartment for the high frequency drying.

It will, therefore, be seen that if the period of high frequency drying constitutes one time unit (which in the example given is four hours but may be longer or shorter), the period of air drying will always constitute an even multiple of the high frequency drying time. This will insure continuous use of the high frequency energy producing mechanism which is a relatively expensive installation.

If the time of application of high frequency power constitutes one time unit and the total number of time units required for complete drying, namely, the one high frequency drying time unit plus the number of time units utilized in the preceding air drying, is equal to $x$, then the proportion of the time of the total drying cycle applicable to the high frequency stage will be $$\frac{1}{x}$$

and the proportion of the total time applicable to the air drying will be $$\frac{x-1}{x}$$

Thus, it can be seen that each time unit of air drying may be conducted in successive compartments or may be conducted in a single compartment before the high frequency drying is commenced which latter operation may be in a compartment either separate from the air drying compartment or one and the same.

In the form shown in the illustrated embodiment of my invention, the supply pipe 37 is represented as entering the space 78 formed in one of the walls of a compartment and the exhaust pipe 39, as communicating with a similar space 79 in the opposite wall, the passage of the air from the pipe 37 into the compartment being controlled by the louvres 33, and the passage of the air out of the compartment being similarly controlled. This arrangement, although at times desirable, is not absolutely necessary, although, due to the varying moisture content of the different kinds of lumber treated, some means for controlling the temperature and velocity of the heated air is, generally speaking, highly desirable.

In carrying out the first step of my method, it is desirable to subject the lumber to a current of heated air having a substantial velocity, as distinguished from drying lumber by subjecting it to heated air which has no motion. By so doing, much time is saved and the danger of discoloration and distortion of the lumber is eliminated because, among other reasons, the vapor emanating from the wood is immediately blown off the surface thereof.

It will be noted that after four hours of treatment by a moving current of heated air, the rate of evaporation or reduction of moisture content of the wood shows a marked decrease (Fig. 19). As the wood becomes drier, its dielectric constant becomes smaller, the capacitance of the capacitor of which the wood is the dielectric, becomes smaller, the capacitive reactance—the reciprocal of the product of capacitance by the product of $2\pi$ by the frequency—becomes larger and the power factor—the consine of the angle of advance—becomes smaller, whereas should such electric power be applied to green lumber, a much larger amount of power would be required on account of the higher power factor thus making the cost prohibitively high and commercially impracticable. It will be obvious, of course, that the mass of lumber to be dried and the electrodes 62, 68, 67, constitute a capacitor, the capacitance of which will vary directly with the area of the electrodes and the dielectric constant of the material placed between them and inversely with the separation of each pair of electrodes 62, 68, and 67, 68 (Fig. 8). The dielectric of this condenser consists partly of air and partly of partially dried wood, including, of course, a certain amount of water. This condenser will be charged and discharged twice per cycle just like any condenser of the ordinary commercial type. For alternating current of the high frequency above specified, 6.5 mc., or, for that matter, even of a much lower frequency, the "skin effect" will cause such current flow as may occur between each of said two pairs of electrodes above specified to be confined to the surface of the wood, the penetration being a small fraction of a millimeter, so that the heating effect of such conduction will be practically nil. The skin effect varies inversely as the conductivity of the substance through which the current flows. It has been found that for soft iron, the skin effect at a frequency of 1 million, is 0.005 mm. and as the electrical conductivity of partially dried wood is much lower than that of soft iron, it follows that the skin effect in the present case will be much less than 0.005 mm., so that the heating of the wood due to such conduction will be practically nil.

The charging currents (displacement currents), however, will cause molecular motion in the solid dielectric material placed between said electrodes and, in that way, a large amount of heat will be created in such material uniformly from surface to surface. The conductance of the wood diminishes with the moisture content thereof, therefore, high frequency electrical power may be applied to the wood economically to effect the necessary reduction in the moisture content of the lumber after eight hours treatment with heated air sufficiently to bring it within the range of the moisture content of commercial dry lumber without distortion or discoloration within a relatively short time. This is shown by the dotted line curves in Fig. 19 which indicate a very rapid rate of drying between the eighth and twelfth hour. Thus, it will be noted with respect to the uppermost curve that in four hours, from the 8th to the 12th hour, the moisture content has been reduced from about 48% to about 15%, while if the heated air treatment had been continued to the twentieth hour, without any application of the high frequency electric power, the moisture content would have been about 25%. In the lowermost curve, the moisture content of the wood is reduced from 23% to 3% by four hours application of the high frequency power, while if the heated air treatment alone had been continued to the twentieth hour, the moisture content of the wood would have been 13%.

It is necessary that the lumber be subjected to heated gas simultaneously with the application thereto of the high frequency electric power because, among other reasons, the temperature to which the lumber is raised by high frequency power in the second step of my process, is much higher than that to which the lumber is raised by the heated gas in the first step thereof, and, therefore, the circulation and recirculation of the heated gas through the spaces between the lumber while the latter is being subjected to high frequency power, prevents a rise in the temperature of the lumber sufficiently high to produce discoloration or distortion thereof. This current of heated gas also performs the same function that it effects in the first step, viz., carries away the vapors caused by the evaporation of moisture of the wood and tends to equalize the drying of the several boards. Another reason will be obvious from an inspection to Fig. 19 showing curves based on actual tests, and that is, that the time of reducing the moisture content to the percentage desired, is slightly reduced by the heated gas. For example, in the uppermost curve, the effect of the heated gas current is a gain of about 11% in moisture content reduction, for said curve crosses the 12th hour ordinate at about 37% and the 8th hour ordinate at about 48%, showing that during the last period of 4 hours, the heated gas current is responsible for a reduction of 11% in the moisture content.

My invention does not exclude the application of high frequency electric power and simultaneously therewith a current of heated gas to lumber that has been partially dried by methods other than that herein set forth, namely, to kiln dried or air dried lumber, but, in such case, the lumber so dried is, generally speaking, somewhat discolored either by blackened pitch pockets or by fungus or mold requiring the planing of the surfaces of the lumber before it is generally useful. In this case as in all variants of my process, the temperature of the heated gas to which the partially dried lumber is subjected simultaneously with the high frequency electric power treatment, should be low enough to prevent the temperature of the lumber due to the combined action of the electric power and heated gas from rising high enough to produce discoloration or distortion of the lumber, but, nevertheless, high enough to serve as an insulator for the heat produced in the lumber by the high frequency power, that is to say, high enough to prevent a substantial amount of the heat in the lumber from escaping into the ambient gas. While the time of producing commercial dried lumber in this manner is longer than that required by my preferred process, it is, nevertheless, much shorter than that required to reduce the moisture content of the lumber to the range of the moisture content of commercial dried lumber, viz., between 4% and 15%, by using the kiln drying method or the air drying method, without more. By the term "stationary," as applied to the mass of lumber to be dried, I desire to be understood as meaning that there is no relative movement between the lumber and the electrodes 62, 67, 68, in compartment 26, during the time the wood is being subjected to the high frequency power, as shown in the drawings selected to illustrate my invention.

Having thus disclosed my improved method and an illustrative embodiment of apparatus whereby the method may be practiced, without limiting myself thereto, what I claim and desire to secure by Letters Patent is:

1. The method of drying green lumber in a large mass in successive stages which include gas drying and high frequency energy drying stages comprising the steps of subjecting the mass, while stationary and commencing while the lumber is in its initially green condition, to a current of gas of high temperature but less than 225° F. for a plurality of units of time in which each unit of time is equal to the time of the high frequency energy drying stage to reduce the moisture content of the wood by means of the heat applied over said plurality of units of time to less than fifty percent and to cause the lumber to be progressively drier outwardly from the interior to the surfaces thereof, the total time of all of said plurality of units of time being approximately equal to $$\frac{x-1}{x}$$

of the total drying cycle where $x$ equals the total number of units of time used in the gas drying stage plus the one unit of the high frequency drying stage, and then subjecting the mass while stationary and while the lumber is in the condition resulting from the drying performed in the preceding gas drying stages to high frequency energy in which the amount of high frequency energy applied is sufficient to boil the liquid in the interior of the individual pieces of the lumber at a rate which will cause the steam so generated to flow outwardly without damage to the lumber through the previously dried outer portions of said lumber, and simultaneously passing a current of heated gas over the individual surfaces of the pieces of lumber in said mass at a temperature less than that of said lumber thereby to prevent excessive heating of the surfaces of the lumber, the length of the period of the high frequency stage of drying being one time unit and equal to $$\frac{1}{x}$$

of the total drying cycle and then allowing any remaining surface moisture to evaporate after discontinuance of said high frequency energy.

2. The method set forth in claim 1, the high frequency energy applied in the high frequency drying stage being not in excess of 35 watts per pound of wood.

3. The method set forth in claim 1, in which $x$ equals three whereby the total gas drying time is twice the high frequency energy drying time.

4. The method set forth in claim 1, in which the high frequency energy drying stage commences when the moisture content of the lumber is between twenty and fifty percent and is discontinued when the moisture content has been reduced to between three and fifteen percent.

5. The method set forth in claim 1, in which the high frequency energy drying stage commences when the moisture content of the lumber is between twenty and fifty percent and is discontinued when the moisture content has been reduced to between three and fifteen percent and the energy applied to said lumber during said drying stage is not in excess of thirty-five watts per pound of dry wood.

HAROLD P. WOOD.

REFERENCES CITED

The following references are of record in the file of this patent:

UNITED STATES PATENTS

| Number | Name | Date |
| --- | --- | --- |
| 687,033 | Kester | Nov. 19, 1901 |
| 785,544 | Emerson | Mar. 21, 1905 |
| 1,147,593 | Ayres | July 30, 1915 |
| 1,161,587 | Ayres | Nov. 23, 1915 |
| 1,298,285 | Bogoty | Mar. 25, 1919 |
| 1,353,591 | Hope et al. | Sept. 21, 1920 |
| 1,498,173 | Kelley | June 17, 1924 |
| 1,711,100 | Payzant | Apr. 30, 1929 |
| 1,867,546 | Baer | July 19, 1932 |
| 2,042,145 | Darrah | May 26, 1936 |
| 2,231,457 | Stephen | Feb. 11, 1941 |
| 2,307,344 | Zottu | Jan. 5, 1943 |
| 2,325,652 | Bierwirth | Aug. 3, 1943 |
| 2,328,225 | Morey | Aug. 31, 1943 |
| 2,387,595 | Luth et al. | Oct. 23, 1945 |
| 2,397,897 | Wenger | Apr. 2, 1946 |
| 2,408,434 | Mann et al. | Oct. 1, 1946 |
| 2,421,690 | Ensor et al. | June 3, 1947 |

OTHER REFERENCES

"Drying and Laminating by Radio Frequency" by George F. Russell, published on pages 38, 40 and 42 of The Timberman, August 1944.